Nov. 24, 1959　　H. A. AUSTIN ET AL　　2,914,316
FIXTURE FOR ASSEMBLING BLOWER WHEELS
Filed April 12, 1957　　　　　　　　　　　　　4 Sheets-Sheet 1

INVENTORS
HAROLD A. AUSTIN
ARTHUR M. WALDO
BY
Woodhams Blanchard & Flynn
ATTORNEYS Nov. 24, 1959  H. A. AUSTIN ET AL  2,914,316
FIXTURE FOR ASSEMBLING BLOWER WHEELS
Filed April 12, 1957  4 Sheets-Sheet 2
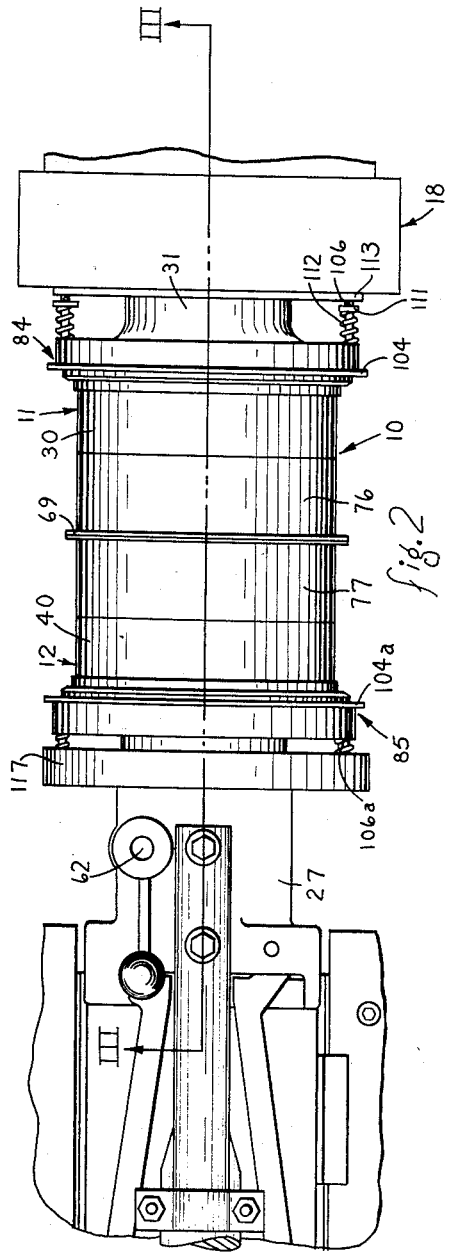
INVENTORS
HAROLD A. AUSTIN
BY ARTHUR M. WALDO
Woodhams, Blanchard & Flynn
ATTORNEYS

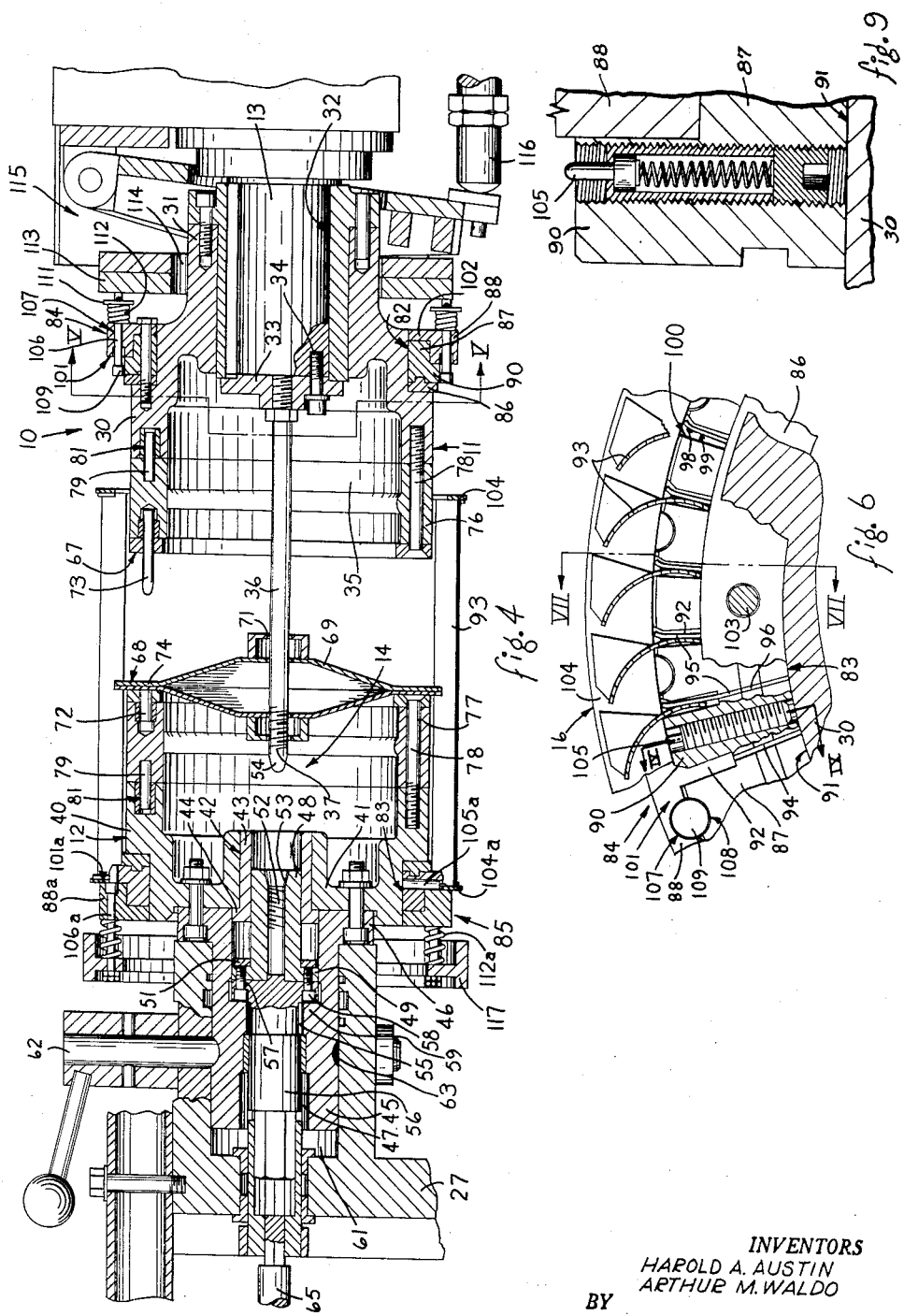

Nov. 24, 1959  H. A. AUSTIN ET AL  2,914,316
FIXTURE FOR ASSEMBLING BLOWER WHEELS
Filed April 12, 1957  4 Sheets-Sheet 4

INVENTORS
HAROLD A. AUSTIN
ARTHUR M. WALDO
BY
Woodhams, Blanchard & Flynn
ATTORNEYS

2,914,316
FIXTURE FOR ASSEMBLING BLOWER WHEELS

Harold A. Austin, Kalamazoo, Mich., and Arthur M. Waldo, Toledo, Ohio, assignors to Brundage Company, Kalamazoo, Mich., a corporation of Michigan Application April 12, 1957, Serial No. 652,493

15 Claims. (Cl. 269—109)

This invention relates in general to a fixture by which the parts of a centrifugal blower wheel are assembled and, more particularly, to a type thereof which is adaptable for use with a machine for automatically fabricating a centrifugal blower wheel. Such a machine is disclosed in detail in our co-pending application entitled "Apparatus and Method for Assembling a Centrifugal Blower Wheel" Serial No. 652,525, filed April 12, 1957, and assigned to the assignee of this application.

The use of some type of fixture upon which the parts of a blower wheel may be assembled and held while the said parts are being secured to each other is not new. However, none of these fixtures, insofar as it is known, is designed or arranged for receiving and holding the parts of the blower wheel in proper position with respect to each other while said parts are welded together to form a finished blower wheel. Also, no fixture is known to have existed previously which will hold all of the necessary parts for a double blower wheel and which is adaptable for use with a completely automatic machine for fabricating blower wheels, particularly by the use of a welding process.

Accordingly, the primary object of this invention has been the provision of a fixture upon which the component parts of a centrifugal blower wheel can be completely assembled, and which is so constructed and arranged that said parts can then be secured to each other, as by welding, and the blower wheel is completely fabricated when it is removed from the fixture.

A further object of this invention has been the provision of a fixture, as aforesaid, which is adaptable for use with a fully automatic machine for assembling and fabricating blower wheels, which machine includes mechanism for moving said fixture from a position where it receives a portion of the blower wheel parts into a position where it receives the remainder of said parts, and all of said parts are secured together to form a finished blower wheel, such movement and securing being effected completely automatically.

A further object of this invention has been the provision of a fixture, as aforesaid, which is arranged so that the finished blower wheel can be removed therefrom by mechanical means, which do not require manual handling of the wheel, thus minimizing the possibility of injury to the operator of said machine.

A further object of this invention has been the provision of a fixture, as aforesaid, upon which blower wheels can be fabricated with less variation and greater dimensional accuracy than previously possible, particularly where manual methods of assembly have been utilized.

A further object of this invention has been the provision of a single fixture, as aforesaid, which is provided with all the necessary means for receiving the parts of either a single or double-type centrifugal blower wheel and for holding said parts in proper relationship with respect to each other while said parts are secured to each other in some selected manner, as by welding.

A further object of this invention has been the provision of a fixture, as aforesaid, which is so constructed that it can be easily and quickly mounted upon, or removed from, said automatic machine for fabricating centrifugal blower wheels, and which can be readily adapted for holding the parts of wheels having different numbers of blades.

Other objects and purposes of this invention will become apparent to persons familiar with this type of equipment upon reading the following specification and examining the accompanying drawings, in which:

Figure 2 is a top plan view of a portion of the machine shown in Figure 1, including one of said fixtures.

Figure 3 is a sectional view taken along the line III—III of Figure 2.

Figure 4 is an enlargement of Figure 3, showing one of said fixtures in a partially opened position.

Figure 6 is an enlarged, broken fragment of Figure 5.

Figure 9 is a sectional view taken along the line IX—IX in Figure 6.

Figure 1:
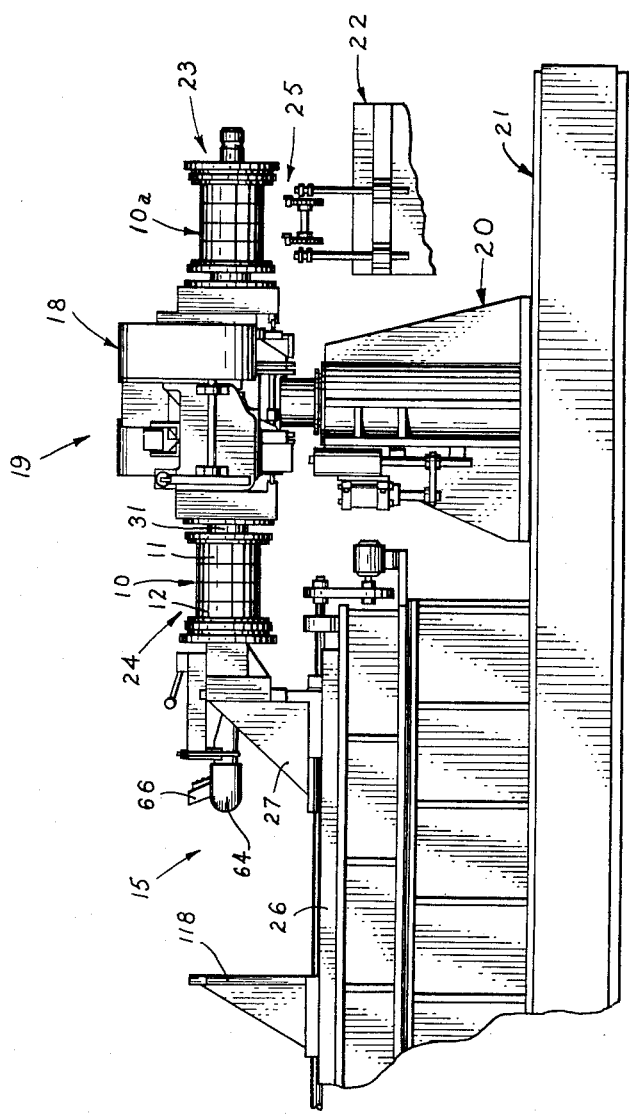
Figure 1 is a broken, side elevation view of a portion of an automatic machine for fabricating centrifugal blower wheels, which machine utilizes a pair of the fixtures to which this invention relates.

For purposes of convenience in description, the terms "inner," "outer," and derivatives thereof, will have reference to the geometric center of the fixture and parts related thereto. The terms "fixed," "movable," and derivatives thereof, will have reference to the rightward and leftward portions, respectively, of the fixture as shown in Figures 1 and 4.

General description

In order to meet the objects and purposes of this invention, there is provided a fixture 10 (Figure 4), which is comprised fundamentally of two separable members 11 and 12, the member 11 being fixed with respect to a base and the member 12 being movable. The fixed member 11 may be removably supported by the drive shaft 13 (Figure 3) on the indexing head 18 of an automatic machine 19 for fabricating centrifugal blower wheels 16. The movable member 12 is removably supported upon said fixed member 11 by means of the connector mechanism 14. A discharge device 15 is provided for moving the movable member 12 toward and away from the fixed member 11, and for automatically operating the connector mechanism 14, whereby said movable member 12 is secured to, or released from, the fixed member 11.

Detailed construction

The construction, and particularly the operation, of the fixture 10, to which this invention relates, are best disclosed by association with, and reference to, a machine 19 (Figure 1) with which said fixture may be used. The pertinent parts of such a machine are shown in the extent required to illustrate said fixture (Figures 1, 2 and 3). Further details of said machine 19 may be found in said co-pending application relating to the entire machine.

A pair of fixtures 10 and 10a (Figure 1) may be rotatably supported for movement about parallel, horizontal axes on opposite sides of the indexing head 18 of the automatic machine 19 for fabricating centrifugal blower wheels 16. A wheel of the type produced by the fixture 10 is disclosed in the co-pending application entitled "Blower Wheel Assembly," Serial No. 652,513, filed April 12, 1957, and assigned to the assignee of this application. The indexing head 18 is rotatably supported upon a pedestal 20 for rotation about a substantially vertical axis. Suitable actuating means, not shown, is provided within the base frame 21 for periodically rotating the indexing head through an arc of approximately 180°. In this manner, the fixtures 10 and 10a periodically reverse their positions, one position being located adjacent to the discharge device 15 and referred to as the "discharge position 24." The other position is located above the elevator mechanism 22 and is referred to as the "assembly position 23." The fixture 10, disposed in the discharge position, is loaded with certain parts of a wheel, after which it is moved to the assembly position 23. The remaining parts of the wheel are automatically assembled on the fixture and all of the wheel parts are secured together while said fixture 10 is in the assembly position. The fixture 10 is then returned to the discharge position, where the completed wheel is removed and another set of said certain parts is loaded upon the fixture 10. The fixture 10a operates through the same sequence as the fixture 10, occupying said positions alternately with the fixture 10. In this particular embodiment, the fixtures 10 and 10a are substantially identical. Thus, the fixture 10, only, will be described in detail.

A conveyor mechanism 25 passes beneath the assembly position 23 and above the elevator mechanism 22 to supply blower blades to the elevator mechanism 22 for reasons appearing hereinafter. The discharge device 15 is comprised of a support frame 26 and a discharge head or slider 27, which is slidably supported upon said frame 26 for lengthwise movement toward and away from the discharge position 24. Further details of the construction of the slider 27 and portions of the indexing head 18 adjacent to the fixture 10 will be provided hereinafter in connection with associated parts of said fixture. However, it will be recognized and understood that specific reference to a particular, automatic machine, with which said fixture may be advantageously used, is not intended to limit in any way the construction, operation or scope of this invention, and that such reference is intended for convenience in illustration only.

As best illustrated in Figures 2, 3 and 4, the fixture 10 is comprised of a pair of coaxial, mating members 11 and 12 and has an external appearance of a spool when said members are in their mating position adjacent to each other. Fixed member 11 has a cylindrical, hollow, blade-engaging barrel 30, having an integral hub 31 of reduced diameter extending from that axial end thereof remote from the movable member 12. The hub 31 has an opening concentric with said barrel 30, into which the horizontal drive shaft 13 on the indexing head 18 is slidably and non-rotatably receivable. The free end of the drive shaft 13 is secured, as by means of bolts 34, to a retaining plate 33 disposed adjacent to the inner end of the hub 31 within the hollow chamber 35 defined by the barrel 30. A draw shaft 36, which is part of the connector mechanism 14, is rigidly secured to the retaining plate 33 concentric with the barrel 30, and extends through said chamber 35 substantially beyond the axial end of said barrel remote from said hub 31. The free end of said shaft 36 disposed externally of the barrel 30 is provided with a threaded portion 37 for reasons appearing hereinafter.

The movable member 12 of the fixture 10 (Figure 4) has a blade barrel 40, which is externally cylindrical and preferably of substantially the same outside diameter as the blade barrel 30 of the fixed member 11. In this particular embodiment, the barrels 30 and 40 are shown to be of the same axial length. However, the relative axial lengths of the two barrels may be varied, as desired or required, within the scope of this invention. The blade barrel 40 has a circular end plate 41 integral there- with at the axial end thereof remote from the fixed member 11. Said end plate 41 is provided with a central opening 42 concentric with said barrel 40, in which a sleeve bearing 43 is disposed. Said sleeve bearing 43 is held in the opening 42, as by the radially extending, annular flange 44 at the outer end thereof, which embraces the outer axial face of the circular end plate 41 adjacent to the opening 42 therein. A connector hub 45, which is of lesser diameter than the blade barrel 40, has a radially outwardly extending flange 46 near one end thereof for securing said hub to the outer axial face of the circular end plate 41. Said hub is provided with a central opening 47 adjacent to the flanged end which slidably embraces and surrounds the annular flange 44 on the sleeve bearing 43.

A draw nut 48 (Figure 4) is rotatably supported within the sleeve bearing 43. It has an external, annular flange 49 disposed within the opening 47 in the hub 45 outwardly of the sleeve flange 44. A thrust collar 51 is disposed between the flange 49 and the flange 44. The nut 48 has a central, threaded opening 52 concentric with said barrel 40 and threadedly engageable with the threaded end 37 on the draw shaft 36 when said movable member 12 is moved toward the fixed member 11 along a line coaxial therewith. The internal end of the draw nut 48 is expandingly flared at 53 for piloting the tapered tip 54 of the draw shaft 36 into the threaded opening 52.

The central opening 47 (Fig. 4) of the hub 45 has a portion 55 of reduced diameter disposed between the axial ends thereof. Said reduced portion is provided with a suitable bearing surface for engaging and supporting a nut actuating shaft 56. The nut actuating shaft 56 has an annular flange 57 disposed within the central opening 47 adjacent to the flange 49 on the draw nut 48. Means, such as bolts 58, may be provided for securing the flange 57 to the flange 49. The nut actuating shaft 56 and the draw nut 48 are slidably movable to the extent limited by the distance between the thrust bearing 51 and the shoulder 59 provided by the reduced portion 55 of the central opening 47. This distance will be advantageously such that the nut 48 may be substantially disengaged from the threaded portion 37 of the draw shaft 36 while the blade barrels 30 and 40 are in substantially abutting relationship with respect to each other. The sleeve bearing 43, the nut 48 and the nut shaft 56 combine with the draw shaft 36 to provide said connector mechanism 14.

The connector hub 45 (Figure 4) is snugly and slidably receivable into an appropriate opening 61 in the adjacent side of the discharge head 27 whereby the movable member 12 is supported when it is disengaged from the fixed member 11. The discharge head 27 is provided with a lock bolt 62, which is extendable into the opening 61 for reception into an annular groove 63 in the circumferential surface of the hub 45. Said bolt 62 releasably locks the movable member 12 with respect to the discharge head 27. Said discharge head 27 also supports a power driven wrench mechanism 64 (Figure 1) having a power shaft 65 (Figure 4) slidably engageable with the nut shaft 56 for rotating same and thereby securing or releasing the connector mechanism 14. Conventional, manually operable trigger mechanism 66 is provided for operating the power wrench 64.

The blade barrels 30 and 40 (Figures 3 and 4) have opposing annular faces 67 and 68 for embracing the opposite axial surfaces of the center structure 69 of the blower wheel 16. When the center structure 69 is disposed between the blade barrels 30 and 40, the draw shaft 36 extends through the shaft opening 71 of said structure. A plurality of guide pin openings 72, here two, whose axes are parallel with the axis of the fixture 10, are provided in one or both of the annular faces 67 and 68. A plurality of guide pins 73, equal in number to the guide pin openings 72, are secured to one or both of said annular faces 67 and 68 for cooperative insertion into said guide pin openings 72. These guide pins 73 and their corresponding openings 72 provide for proper alignment of the movable member 12 with respect to the fixed member 11. Normally, the guide pins 73 will be secured to one of said members 11 and 12, whereas the openings 72 will be provided in the other member. In this particular embodiment, the pins are received into the movable member 12, the pins 73 being secured to the fixed member 11 and the openings 72 for said pins 73 being provided in the movable member 12. Also, said pins and openings will normally be spaced uniformly around said annular faces 67 and 68 so that said members 11 and 12 will be brought together without destroying the required registration between the two members 11 and 12, which will be discussed in detail hereinafter. Appropriate pin openings 74 are provided in and through the center structure 69 for reception of the guide pins 73 through said center structure.

If it becomes desirable to use the fixture 10 for fabricating a blower wheel which, for some reason, does not utilize a center plate, or other center structure, the annular faces 67 and 68 may then be in contact with each other. Inasmuch as the blade length of the blower wheel assembled upon the fixture 10 may be varied from time to time, it is desirable that some convenient method be provided for varying the axial length of the fixture, hence the lengths of the blade engaging barrels 30 and 40. In this particular embodiment, such variation in the length of the barrels 30 and 40 is effected by constructing said barrels with removable insert portions 76 and 77 adjacent to their annular faces 67 and 68, respectively. Said inserts 76 and 77 are secured to the remainder of said barrels by means, such as the bolts 78. Locator pins 79 and corresponding openings 81 may be provided on said inserts and barrels for assuring proper registration and assembly thereof. Said inserts may be of the same axial length or of different axial lengths.

Figure 7:
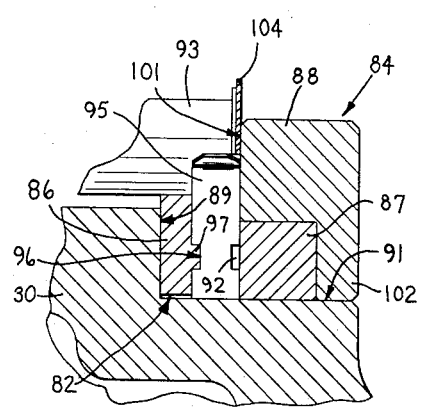
Figure 7 is a sectional view taken along the line VII—VII of Figure 6.

The blade barrels 30 and 40 (Figures 4 and 7) are provided with annular notches 82 and 83, respectively, at the axial ends thereof, remote from each other and adjacent to their respective hubs, into which annular blade positioning mechanisms 84 and 85 are receivable. Since the blade positioning mechanisms 84 and 85 may be, and advantageously are, substantially mirror images of each other, a detailed description will be given of the blade positioning mechanism 84 associated with the barrel 30 of the fixed member 11, and such will be understood to apply in substance to the blade positioning mechanism 85 also. Thus, reference is made to certain parts of the blade positioning mechanism 85 by adding the suffix a to the reference numerals of the corresponding, described parts of the blade positioning mechanism 84.

Figure 5:
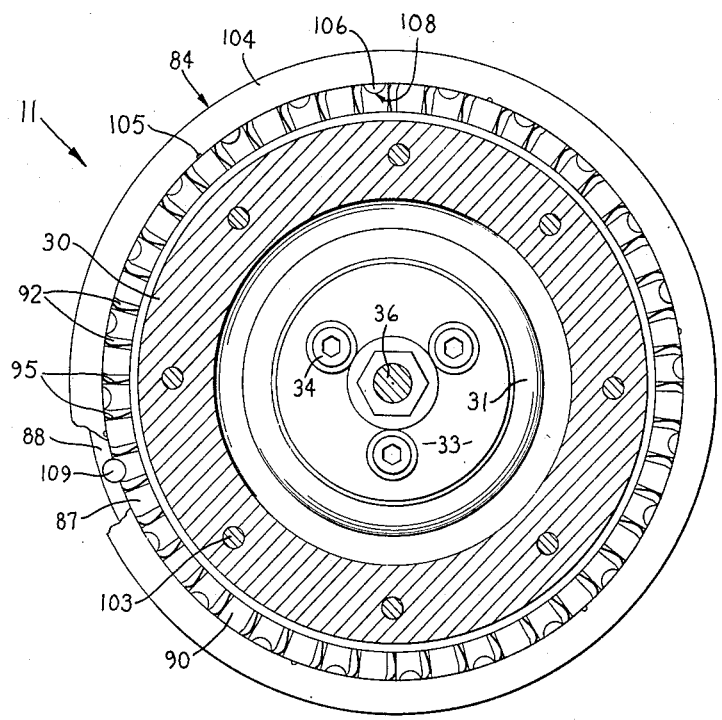
Figure 5 is a sectional view taken along the line V—V of Figure 4.

In this particular embodiment, the blade positioning mechanism 84 (Figure 7) is comprised of an inner retaining ring 86, an intermediate slot ring 87, and an outer or welding ring 88. The retaining ring 86 is preferably slightly larger in outside diameter than the blade barrel 30, and is disposed adjacent to the axial surface 89 of the annular notch 82. Said retaining ring 86 has a coaxial, annular bead 97, which extends from the axial face thereof remote from the surface 89 of the notch 82, and which is spaced from the peripheral surface 91 of the notch 82. The slot ring 87 embraces the peripheral surface 91 of the notch 82, adjacent to the retaining ring 86, and has a portion 90 (Figures 4 and 5) of enlarged diameter adjacent to said retaining ring 86, which portion extends radially outwardly beyond the peripheral surfaces of both the barrel 30 and the retaining ring 86. The portion 90 of the slot ring 87 is provided with a plurality of uniformly spaced blade slots 92 which, in this embodiment, are substantially radially disposed, for receiving the edges of the blades 93 adjacent to the ends thereof, one blade being disposed in each slot. Said slots 92 preferably extend slightly below or inwardly of the periphery of the retaining ring 86 so that the inner edges of the blades 93 may snugly engage said ring 86.

A relatively narrow slit 94 (Figure 6) extends radially inwardly from the bottom of each said slot 92 for reception of a flat spring 95, which extends up through the slot 92 between the opposing surfaces thereof. Each said spring 95 is provided with a notch 96 into which the annular bead 97 on the retaining ring 86 is receivable for preventing disengagement of the springs 95 from the slot ring 87. As shown in Figure 6, the flat springs 95 may be curved near their outer ends to facilitate insertion of the blades 93 into the slots 92 adjacent to said springs 95. Also, said springs 95 may be provided with a small boss 98 near their outer free ends on the convex sides 99 thereof for effecting a better gripping of said blades 93 after they are inserted within said slots adjacent to the convex sides 99 of said springs 95.

The welding ring 88 has an inner, axial face 101, which lies adjacent to the enlarged portion 90 of the slot ring 87 and extends radially outwardly beyond said enlarged portion. Said welding ring 88 has an annular, inwardly extending flange 102, which embraces the outer, axial end of the slot ring 87 and an adjacent portion of the peripheral surface 91 of the annular notch 82. Said rings 86, 87 and 88 are all held in fixed position with respect to each other and with respect to the blade barrel 30 by means of bolts 103 which extend through appropriate openings in said rings and through the axial surface 89 of said notch 82 to be threadedly seated into the blade barrel 30.

A blade ring or end rim 104 (Figures 4, 5, 6 and 7) is slidably mountable onto the enlarged portion 90 of the slot ring 87 adjacent to the inner, axial face 101 of the welding ring 88. Said rim 104 is releasably held in position against said inner face 101 by a plurality of springback detent pins 105 (Figure 9), which are radially disposed, one each, between a pair of adjacent blade slots 92 (Figure 6) in said slot ring 87. Said end rim 104 must be forced (although only a mild force is required) over the outwardly extending tips of the detent pins 105 to become engaged with the inner, axial face 101 of the outer or welding ring 88.

A plurality of parallel stripping pins 106 (Figures 4 and 5), which are preferably coaxial with the axis of the fixed member 11, are slidably disposed within suitable pin openings 107 extending through the welding ring 88, and are extendable through the inner, axial face 101 of said welding ring, near the periphery thereof. The slot ring 87 may be relieved, as at 108, between a pair of slots 92, to permit the extension therethrough of the stripping pins 106. The pins 106 are provided with heads 109 at their inner ends, which limit their inward movement through the openings 107. Washers 111 are held on the pins 106 near their outer ends to limit the inward movement of said pins. Resilient means, such as the spiral springs 112, are sleeved upon the pins 106 between said washers and the adjacent surface of the welding ring 88, thereby urging said pins outwardly into their retracted positions.

Suitable means, including the stripper plate 113 having a central opening 114, may be mounted upon the indexing head 18, encircling the hub 31 adjacent to the fixed member 11, for engaging said pins. Said plate may be moved toward said welding ring 88 to engage the pins 106 by the linkage 115, which is actuated by a pressure cylinder 116 associated with, and mounted upon, the indexing head 18. Thus, movement of the plate 113 toward the welding ring 88 effects an engagement and extension of the stripping pins 109, thereby stripping the rim 104 from engagement by the detent pins 105 of the blade positioning mechanism 84. Further details of this structure may be found in the above-mentioned co-pending application.

The blade positioning mechanism 85, and parts associated therewith, on the movable member 12 may be substantially the same in construction as discussed hereinabove with respect to the blade positioning mechanism 84. However, the stripping pins 106a (Figure 4) may, for convenience, be secured at their outer ends to a pin support ring 117, which encircles the hub 45 on the movable member 12. Resilient means, such as the spiral springs 112a, are sleeved upon the pins 106a between the pin support ring 117 and the adjacent surfaces of the welding ring 88a for resiliently resisting extension of the stripping pins 106a inwardly of the inner face 101a of the welding ring 88a. Suitable means, such as a pair of spaced bumpers 118, may be adjustably supported upon the frame 26 of the discharge device 15 for engaging opposite sides of the ring 117 as the discharge head 27 is moved rearwardly along said frame and between said bumpers while carrying the movable member 12, including the ring 117. Such engagement of the ring 117 with the bumpers 118, which preferably occurs just before the head 27 reaches the end of its rearward travel, effects a compression of the springs 112a and an extension of the pins 106a, thereby stripping the rim 104a from the blade positioning mechanism 85.

*Operation*

Before proceeding with the operation of the fixture 10, including the adjacent parts of the machine 19 for assembling and fabricating a blower wheel, the fixture 10 must first be arranged for handling the particular wheel structure which it is desired to fabricate. Having selected a fixture whose members 11 and 12 have respective blade barrels 30 and 40 of the proper diameter, it is then necessary to select the proper extension members 76 and 77, depending upon the blade length of the particular blower wheel being fabricated. The proper inserts 76 and 77 are mounted upon the barrels 30 and 40, respectively, according to the length of the blades 93 and the position of the center structure 69, where such is used, with respect to the end rims 104 and 104a on the finished wheel. Depending upon the size and quantity of blades being used to fabricate the particular blower wheel, the proper blade positioning mechanisms 84 and 85 must then be selected and installed upon the barrels 30 and 40, respectively.

Where, by way of example, the fixture 10 is utilized with a machine 19 having an assembly position 23 and a discharge position 24, the fixed member 11 is mounted upon the drive shaft 13 of the indexing head 18 adjacent to said discharge position. The movable member 12 is mounted upon the discharge head 27, which is retracted from said discharge position. Thus, operation of the machine 19, hence of the fixture 10, normally begins with members 11 and 12 of the fixture 10 separated from each other. Accordingly, the operator of the machine then places a pair of end rings or rims 104 and 104a upon the fixed and movable members 11 and 12, respectively, adjacent to the opposed, axially inner faces 101 and 101a of the welding rings 88 and 88a. A center structure 69 is sleeved upon the draw shaft 36 and moved toward the fixed member 11 until it embraces the annular face 68 thereof. During such movement, the guide pins 73, mounted on said fixed member 11 in this particular embodiment, will be received through the pin openings 74 in said center structure 69. The discharge head 27 is now caused to move the movable member 12 along the support frame 26 until the radially outer portion of the center structure 69 is snugly disposed between the annular faces 67 and 68. The guide pins 73 and guide pin openings 72 provide for proper registration between the members 11 and 12 of the fixture 10. The power wrench 64 is again actuated, whereby the draw nut 48 and draw shaft 36 are threadedly engaged with each other to effect a snug, firm connection between the fixed and movable members of said fixture. The lock bolt 62 is released and the discharge head 27 is backed away from the fixture 10. The center structure 69 is firmly held between the members 11 and 12 and the end rims 104 and 104a are firmly, but releasably, held against the faces 101 and 101a, respectively, by the detent pins 105 and 105a.

The fixture 10 is now moved by the indexing head 18 into said assembly position 23, after which the blades 93 are first mounted upon the fixture 10 and then connected to said rims and center structure. The members 11 and 12 must be properly registered in order to align the slots 92 on the blade positioning mechanism 84 with the slots 92a in the blade positioning mechanism 85. As stated before, this is accomplished by the pins 73 and the pin openings 74. The method of connecting the blades, which may be varied substantially within the concepts of the invention, may include welding, spinning, riveting, or the like. Where, as here, a welding process is employed for illustrative purposes, the end rims 104 and 104a will advantageously extend substantially beyond the adjacent peripheral surfaces of the positioning mechanisms 84 and 85, thereby permitting the engagement of said rims and adjacent portions of said blades by welding electrodes, not shown, for effecting a connection between the blades and the rims. For details of operation of such welding mechanism and a wheel produced thereby, reference is made to the hereinabove mentioned co-pending applications.

After the assembling and welding, or other securing, operations have been completed, the fixture 10 is returned to the discharge position 24. The discharge head 27 is caused to move toward the fixture 10 along the frame 26 and reengage the connector hub 45, after which the lock bolt 62 is caused to snugly engage the walls of the groove 63 in said hub 45. Simultaneously with such engagement, the nut shaft 56 will be operably connected to the power shaft 65 of the power wrench 64. Actuation of the trigger mechanism 66 by the machine operator will, therefore, cause the power wrench 64 to disconnect the draw nut 48 from the draw shaft 36. The discharge head 27 of the mechanical device 15 is then caused to withdraw the movable member 12 away from the fixed member 11.

Stripper means, including the pins 106, plate 113 and linkage 115, are actuated by the cylinder 116 as the movable member 12 is moved away from the fixed member 11, thereby stripping the blower wheel 16 from the fixed member 11 and normally causing said wheel to be carried away with the movable member 12 and the discharge head 27. When the discharge head 27 passes between the bumpers 118, the pin support ring 117 will be engaged by said bumpers, thereby actuating the stripping pins 106a supported on said ring 117 and stripping the blower wheel from the movable member 12. The blower wheel 16 may then be removed, either mechanically or manually, from the movable member 12. The fixture is now ready for reloading with another pair of rims 104 and 104a and a center structure 69, in the same manner as it was initially loaded.

When the fixture 10 is in the assembly position 23, each one of the blade slots 92 on each of the slotted rings 87 has a blade 93 inserted thereinto. In this particular embodiment of the invention, the fixture 10 and slots 92 thereof are particularly designed for assembly of a blower wheel having the forwardly curved type of blade. Thus, when a blade is inserted into a blade slot 92 between the convex side 99 of the flat spring 95 and the opposing wall 100 of said blade slot 92, the blade will be engaged along three points, or relatively short lines, of contact. One of said points will be provided by the boss 98 on said flat spring 95, and the other two points will be located on said opposite wall 100 and spaced from each other. The boss 98, being located near the open end of the slot 92, combines with the radially outermost contact point on the opposite wall 100 to effect a wedging action, which tends to hold the blade within the slot 92. It is this relationship which prevents accidental dislodgment of the blade from its proper position within the slot 92 between the time that it is inserted into the slot and the time that it is secured, as by welding, to the adjacent end rim.

In one illustrative operation of a machine 19 equipped with a pair of fixtures 10 and 10a, a representative quantity of double-width blower wheels thus produced were carefully measured. The diameter defined by the radially inner edges of the blades varied about .008 of an inch. The best known methods and fixtures previously used for assembling blower wheels of the type measured cannot insure accuracy of this diameter below about .025 of an inch.

Figure 8:
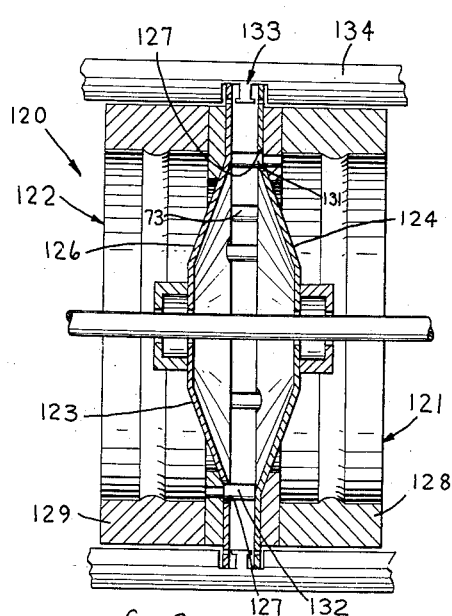
Figure 8 is a fragment of Figure 3 showing a modified construction adapted for an alternate center structure.

The central portion of the fixture 120, shown in Figure 8, has modified members 121 and 122 for engaging and positioning an alternate center structure 123. Said center structure 123, which is detailed in the co-pending application entitled "Blade Center Lock" and assigned to the assignee of this application is comprised of a pair of similar center plates 124 and 126, having point drain openings 127 therethrough.

The members 121 and 122 have modified barrel inserts 128 and 129, respectively. Said barrel inserts 128 and 129 are respectively provided with spacer pins 131 and 132. In this embodiment, there are three spacer pins on each insert and all six pins are arranged substantially at 60° intervals around the fixture, the pins 131 being alternated with the pins 132. The pins 132 on insert 129 extend through point openings 127 in center plate 126 and press center plate 124 against the insert 128. Likewise the pins 131 extend through plate 124 and hold plate 126 against insert 129. Thus, the length of the pins 131 and 132, which is uniform, determines the spacing between the center plates.

The actual spacing between the center plates 124 and 126 during the blade assembly operation will depend largely upon the type of center lock device 133 provided on the blades 134. Where there is used a center lock device 133 of the type appearing in Figure 8 and detailed in the last above mentioned co-pending application, the center plates 124 and 126 must be secured together after the blade assembly is completed, in order to complete the wheel assembly. This may be accomplished by a separate and subsequent operation of any convenient type, such as welding or bolting.

Thus, although particular, preferred embodiments of the invention have been disclosed and described hereinabove for illustrative purposes, it will be understood that variations or modifications thereof, which lie within the scope of such invention, are fully contemplated unless specifically stated to the contrary in the appended claims.

We claim:

1. A fixture for assembling a centrifugal blower wheel having a pair of annular rims secured to the opposite ends of a plurality of identical, uniformly spaced blades, comprising: a pair of substantially cylindrical members having about the same diameter; connector means on said members for releasably holding them in coaxial, abutting relationship; guide means on said members for effecting the mutual, coaxial alignment thereof; a pair of annular flanges secured to, and coaxial with, said members, respectively, the opposing faces of said flanges being spaced from the abutting ends of said members and arranged to engage, respectively, a pair of said annular rims; resilient means on said members for releasably holding said rims against said faces; annular means extending radially from said members near to, and between, said faces, said annular means having a plurality of uniformly spaced, radially disposed slots into which said blades are slidably receivable; and flexible means associated with each slot for releasably holding said blades within said slots.

2. The structure of claim 1 wherein said connector means includes a shaft secured to, and coaxial with, one member and a nut coaxially and rotatably disposed within the other member, said nut being limited by said other member in its axial movement toward said one member and being threadedly engagable with said shaft.

3. The structure of claim 1 wherein said annular means and said annular flanges are independent elements removably mounted upon said members, respectively, adjacent to the remote, axial ends thereof.

4. The structure of claim 3 wherein said resilient means includes a detent pin radially disposed between a pair of adjacent slots in each said annular means and extendable through the periphery thereof near said face, and spring means urging said pin into the extended position.

5. The structure of claim 3 wherein said flexible means comprises a plurality of flat springs located respectively within said slots and disposed radially of said annular means, said springs being anchored at their inner ends upon said annular means, and a bead extending sidewardly from each spring near its outer end for engaging and holding a blade within said slot.

6. The structure of claim 1 wherein said members include removable portions adjacent to said abutting ends, said portions being spaced from said annular means and arranged to embrace and hold therebetween, the center structure of a double wheel.

7. The structure of claim 1 including a pair of stripping mechanisms associated with, and supported upon, said members, respectively, for effecting said release of said rims from said resilient means.

8. A fixture for assembling a centrifugal blower wheel having a pair of annular rims secured to opposite ends of a plurality of identical uniformly spaced blades, comprising: a pair of cylindrical co-axial blade barrels of substantially the same diameter, said barrels being relatively movable toward and away from each other; a pair of hubs, each of said hubs being secured to and extending transversely of one of said blade barrels; a shaft on one of said hubs and extending coaxially of said barrels, said shaft having a threaded portion; a nut on the other of said hubs and positioned coaxial with said shaft and adapted to threadedly engage said shaft, said shaft and said nut being mounted for relative rotation whereby said nut may be threaded upon said shaft to move said barrels toward and away from each other so that said barrels may selectively be releasably held in coaxial, adjacent relationship; interfitting means on the opposing ends of said barrels for locating said barrels in circumferentially aligned relationship; an annular flange extending radially outwardly from each of said barrels, said flanges being spaced from each other a distance greater than the length of the blades and being adapted to engage, respectively, one of said pair of annular rims; blade-holding means secured to each of said barrels adjacent said flange thereon, said blade-holding means extending outwardly from said barrel and adapted to hold one end of each of said blades, the blade holding means on the barrels being circumferentially aligned when said barrels are aligned whereby the blades will be held in proper circumferential alignment.

9. A fixture according to claim 8 wherein said shaft is axially fixed; means in said other hub supporting said nut for rotation and for limited axial movement toward and away from said shaft; and a nut actuating shaft secured to said nut and extending outwardly from said hub.

10. A fixture for assembling a centrifugal blower wheel having a pair of annular rims secured to the opposite ends of a plurality of identical, uniformly spaced blades, comprising: a pair of cylindrical, coaxial blade barrels of substantially the same diameter, said barrels being relatively movable toward and away from each other; connector means on said barrels for releasably holding same in abutting relationship; interfitting means on opposing ends of said barrels for locating said barrels in circumferentially aligned relationship when said barrels are abutting; an annular flange extending radially outwardly from each of said barrels, said flanges being spaced from each other a distance greater than the length of said blades and being adapted to engage, respectively, one of said pair of annular rims; a blade positioning structure secured to each of said barrels and positioned adjacent said flange thereon, said blade positioning structures each including an axial inner ring which is slightly larger in external diameter than the diameter of said barrel, said blades being adapted to rest on said inner ring; a slotted ring positioned between said inner ring and said flange and being of larger diameter than said inner ring and of lesser diameter than the wheel which is formed on the fixture, said slotted ring having a plurality of blade slots extending inwardly from the outer edge thereof to a position located inwardly of the periphery of said inner ring, said slots being equal in number to the number of blades in the wheel.

11. A fixture according to claim 10 including a plurality of circumferentially spaced, axially extending rods extending through each of said flanges and engageable with an annular rim mounted thereon for moving said rim axially with respect to the barrels, said rods having an enlargement thereon adjacent the outer axial end thereof and a coil spring surrounding each of said rods and positioned between the axial outer surface of said flange and said enlargement.

12. A fixture for assembling a centrifugal blower wheel having a pair of annular rims secured to the opposite ends of a plurality of identical, uniformly spaced blades, comprising: a pair of substantially cylindrical members having about the same diameter; connector means on said members for releasably holding them in coaxial, closely adjacent and relatively fixed positions; guide means on said members for effecting the mutual, coaxial alignment thereof; a pair of annular members secured to, and substantially coaxial with, said cylindrical members, respectively, the opposing faces of said annular members being spaced from the abutting ends of said cylindrical members and arranged to engage, respectively, a pair of said annular rims; resilient means supported on said cylindrical members for releasably holding said rims against said faces; annular means substantially coaxial with and extending radially from said members near to, and between, said faces, said annular means having a plurality of uniformly spaced, radially disposed slots into which said blades are slidably receivable; and flexible means associated with each slot for releasably holding said blades within said slots.

13. The structure of claim 12 wherein each cylindrical member has a coaxial hub integral with one end thereof remote from the other cylindrical member; wherein each cylindrical member has at the one end thereof remote from the other cylindrical member a coaxial portion of reduced diameter; and wherein said annular members and said annular means are removably supported upon said reduced portions, said resilient means being operatively associated with said annular means.

14. The structure of claim 12 wherein said annular members are removably mounted upon said cylindrical members at said one end of each, each annular member having a plurality of pin openings substantially parallel with the axis thereof and extending through said face; and including a plurality of pins slidably disposed within said pin openings, resiliently flexible means opposing extension of said pins inwardly of said face, and actuating means simultaneously engageable with the outer ends of said pins for urging them inwardly of said face to move away from said face a rim held thereagainst by said resilient means.

15. The structure of claim 12 wherein each cylindrical member has a coaxial hub integral with one end thereof remote from the other cylindrical member; wherein said connector means includes a shaft coaxially and rigidly secured at one end with respect to one of said hubs and extendable coaxially into the other hub, a nut rotatably supported within the other hub and threadedly engageable with the extended end of said shaft, said nut being capable of limited movement axially of said other hub, and means concurrently engageable with said nut and said other hub for rotating said nut and supporting said cylindrical member associated therewith for effecting the engagement and disengagement of said nut and said shaft.

References Cited in the file of this patent

UNITED STATES PATENTS

| | | |
|---|---|---|
| 165,504 | Pratt | July 13, 1875 |
| 194,342 | Egerton | Aug. 21, 1877 |
| 1,797,702 | Pierre | Mar. 24, 1931 |
| 2,220,610 | Miller | Nov. 5, 1940 |
| 2,537,805 | Wilken | Jan. 9, 1951 |
| 2,651,837 | Wilken et al. | Sept. 15, 1953 |